US009651978B2

(12) United States Patent
Ghayal et al.

(10) Patent No.: US 9,651,978 B2
(45) Date of Patent: May 16, 2017

(54) APPARATUS AND METHOD FOR POWER MANAGEMENT WITH A TWO-LOOP ARCHITECTURE

(71) Applicant: Intel Corporation, Santa Clara, CA (US)

(72) Inventors: Rupak Ghayal, Bangalore (IN); Pradipta Patra, Bangalore (IN); Ramnarayanan Muthukaruppan, Bangalore (IN); Raghu Nandan Chepuri, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 144 days.

(21) Appl. No.: 14/689,600

(22) Filed: Apr. 17, 2015

(65) Prior Publication Data

US 2016/0306374 A1 Oct. 20, 2016

(51) Int. Cl.
*H02J 1/00* (2006.01)
*G05F 3/02* (2006.01)

(52) U.S. Cl.
CPC .................................... *G05F 3/02* (2013.01)

(58) Field of Classification Search
CPC ........................................................ G05F 3/02
USPC ........................................................... 307/80
See application file for complete search history.

(56) References Cited

U.S. PATENT DOCUMENTS 6,222,347 B1 * 4/2001 Gong ...................... G06F 1/263 320/134
7,327,125 B2 * 2/2008 Benbrik .................. G05F 1/565 323/269
7,609,047 B2 * 10/2009 Ravichandran ........... G06F 1/26 323/277

* cited by examiner

*Primary Examiner* — Jared Fureman
*Assistant Examiner* — Duc C Pham
(74) *Attorney, Agent, or Firm* — Schwabe, Williamson & Wyatt, P.C.

(57) ABSTRACT

Described are apparatuses and methods for power management. The apparatus may include a power gate including a plurality of current sources. The power gate may be coupled to a load. The apparatus may further include a voltage control circuit, coupled to the power gate, to determine and select one or more current sources of the plurality of current sources to supply to the load. The apparatus may further include a current control circuit, coupled to the voltage control circuit, to control individual current sources of the one or more current sources to output a constant current. Other embodiments may be described and/or claimed.

23 Claims, 5 Drawing Sheets

APPARATUS AND METHOD FOR POWER MANAGEMENT WITH A TWO-LOOP ARCHITECTURE

TECHNICAL FIELD

This disclosure relates generally to electronic circuits. More particularly but not exclusively, the present disclosure relates to apparatuses and methods for power management with a two-loop architecture.

BACKGROUND

The demand for low-power operation is ubiquitous in nearly every area of electronics. One obvious driver for low-power requirements is the tremendous demand for mobile consumer or business electronic devices. Most of mobile electronic devices are designed to operate on battery power, and the demand for low-power operation of mobile electronic devices increases with advanced displays, advanced wireless technology, increased storage, advanced process technology, system-on-chip (SoC) complexity, etc.

Advancing SoC power management technology is one way to extend the operating life of mobile electronic devices. For SoC power management along with power gating, the ability to control the voltage of a power island dynamically depending on real-time activity or modes is of immense importance. Digitally synthesizable low-dropout (DSLDO) regulators may provide these features up to low dropout conditions (e.g., less than 10 mV) with good power efficiency while serving high load currents.

The background description provided herein is for generally presenting the context of the disclosure. Unless otherwise indicated herein, the materials described in this section are not prior art to the claims in this application and are not admitted to be prior art or suggestions of the prior art, by inclusion in this section.

BRIEF DESCRIPTION OF THE DRAWINGS

The embodiments of the disclosure will be understood more fully from the detailed description given below and from the accompanying drawings of various embodiments of the disclosure, which, however, should not be taken to limit the disclosure to the specific embodiments, but are for explanation and understanding only.

DETAILED DESCRIPTION

Figure 1:
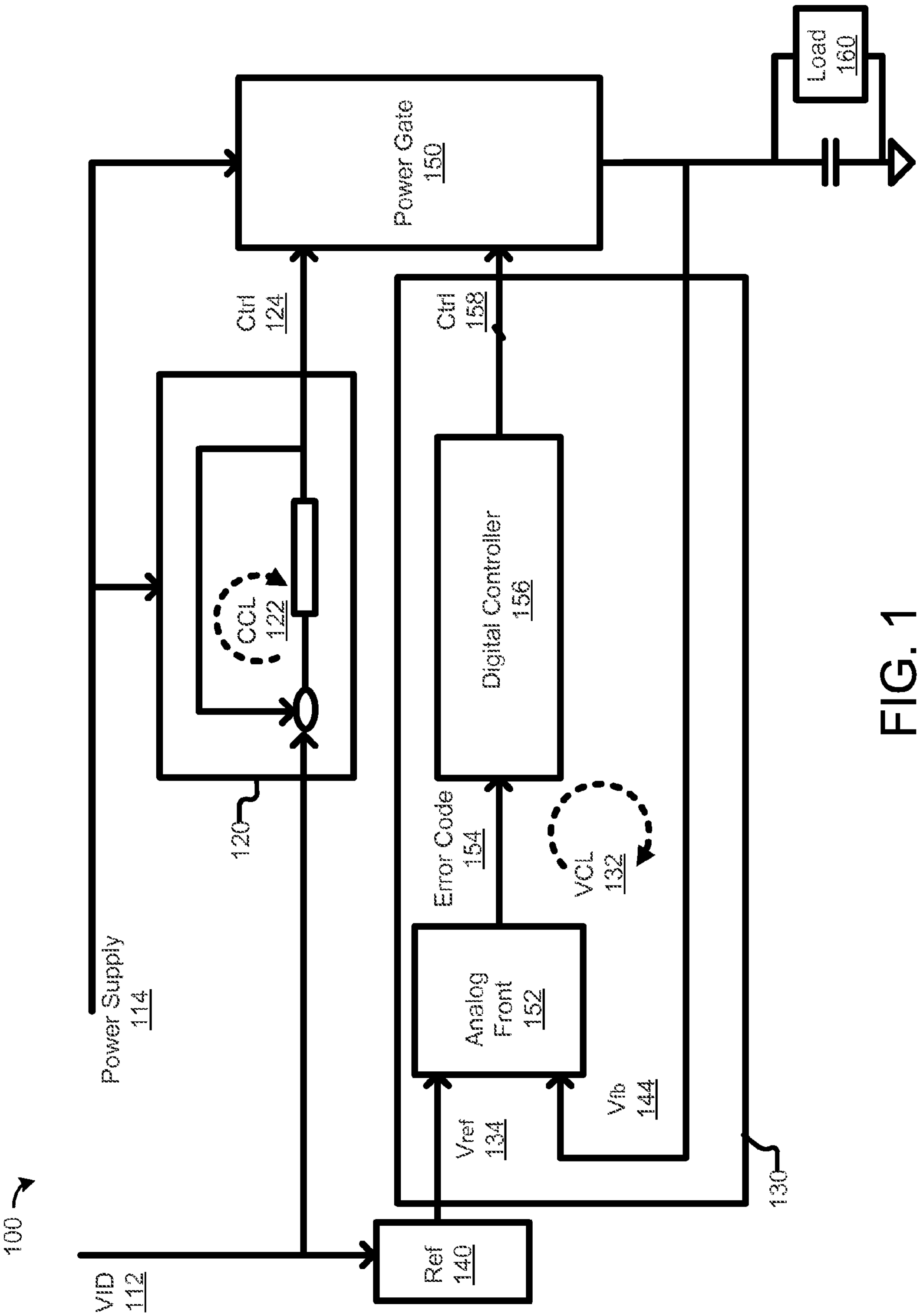
FIG. 1 is a block diagram that illustrates an example apparatus with a two-loop architecture for power management, incorporating aspects of the present disclosure, in accordance with various embodiments.

The embodiments described herein include apparatuses and methods for power management. In some embodiments, an apparatus may include a power gate with a plurality of current sources. The power gate may be coupled to a load. The apparatus may further include a voltage control circuit, coupled to the power gate, to determine and select one or more current sources of the plurality of current sources to supply to the load. The apparatus may further include a current control circuit, coupled to the voltage control circuit, to control individual current sources of the one or more current sources to output a constant current. These embodiments will be described in more detail below. Other technical effects will also be evident from the descriptions to follow.

In the following description, numerous details are discussed to provide a more thorough explanation of embodiments of the present disclosure. However, it will be apparent to one skilled in the art that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate more constituent signal paths, and/or have arrows at one or more ends, to indicate the information flow direction. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct electrical connection between the objects that are connected, without any intermediary devices. The term "coupled" means either a direct electrical connection between the objects that are connected or an indirect connection through one or more passive or active intermediary devices. The term "circuit" means one or more passive and/or active components that are arranged to cooperate with one another to provide a desired function. The term "signal" means at least one current signal, voltage signal, or data/clock signal. The meaning of "a," "an," and "the" include plural references. The meaning of "in" includes "in" and "on."

The terms "substantially," "close," "approximately," "near," and "about" generally refer to being within +/−20% of a target value. The term "scaling" generally refers to converting a design (schematic and layout) from one process technology to another process technology. The term "scaling" generally also refers to downsizing layout and devices within the same technology node. The term "scaling" may also refer to adjusting (e.g., slowing down) a signal frequency relative to another parameter, for example, power supply level.

Unless otherwise specified, the use of the ordinal adjectives "first," "second," "third," etc., to describe a common object merely indicates that different instances of like objects are being referred to, and are not intended to imply that the objects so described must be in a given sequence, either temporally, spatially, in ranking, or in any other manner.

FIG. 1 is a block diagram that illustrates an example apparatus 100 with a two-loop architecture for power management. In some embodiments, apparatus 100 may be a part of a power island (also known as voltage island). Power islands may allow areas of a single chip to operate at voltage levels and frequencies independent from one another. For example, one power island may be connected to the processor core, and another power island may be connected to the I/O ring. In some embodiments, apparatus 100 may be a part of an integrated circuit (IC) die. In some embodiments, apparatus 100 may be a part of a system on chip (SoC).

In various embodiments, apparatus 100 may include two control loops for power management. In the embodiment shown in FIG. 1, apparatus 100 may include a voltage control circuit (VCC) 130 with a voltage control loop (VCL) 132 to determine and select one or more current sources in power gate 150 to supply to load 160. Further, apparatus 100 may include a current control circuit (CCC) 120 with a current control loop (CCL) 122 to control individual current sources of the one or more current sources in power gate 150 to output a constant current to supply to load 160. Thus, in various embodiments, VCC 130 and CCC 120 may use their respective loops VCL 132 and CCL 122 to separately address output voltage regulation and output current regulation of power gate 150.

In various embodiments, CCC 120 may use loop CCL 122 to regulate output current of power gate 150. CCL 122 may be an analog closed loop. CCL 122 may receive voltage identify (VID) 112 and power supply 114, and further output Ctrl 124 as control signal to power gate 150 to control individual current of a plurality of power sources in power gate 150. In various embodiments, VID 112 may represent the output voltage value that power gate 150 is programmed to. In some embodiments, power gate 150 may include a plurality of transistors (e.g., field-effect transistors (FETs)), and individual output current from each transistor may be regulated by CCL 122. s In some embodiments, CCC 120 may include a replica circuit to regulate output current of power gate 150. This replica circuit may create a similar condition in the CCC 120 as the condition in power gate 150 in terms of voltage drop from input supply to output. In various embodiments, CCC 120 may generate Ctrl 124 to limit the current per via or per transistor channel to a current limit (e.g., the technology-specified current limit of the transistors) using a high gain in a closed loop, e.g., CCL 122. In some embodiments, such high gain of the negative feedback loop may be used for the replica bias generation. In one embodiment, the technology-specified current limit is about 30 microamps (uA) per via0 in power gate 150, wherein via0 is the connection between the lowest metal and silicon drain and source diffusion region through the oxide VIA. In various embodiments, CCC 120 may generate Ctrl 124 to modulate the resistance of the power FETs in power gate 150 as a function of the voltage dropout across the effective resistance of the power FETs in power gate 150, and thus to keep the current per transistor constant as a current source.

In various embodiments, VCC 130 may use loop VCL 132 to regulate output voltage of power gate 150. VCL 132 may be a digital control loop. VCL 132 may include analog front circuit 152 to receive a reference voltage (e.g., Vref 134) from a reference voltage generator (e.g., Ref 140), and a feedback voltage (e.g., Vfb 144) from the output of power gate 150. In some embodiments, Ref 140 may be implemented as a temperature independent voltage reference circuit, which produces a fixed voltage based on VID 112, irrespective of power supply variations, temperature changes, or the loading. In some embodiments, Ref 140 may be resistance ladder acting as a digital-to-analog (DAC) element with VID 112 as its digital input. Ref 140 may produce an equivalent analog voltage for VID 112 depending on the reference input give to the resistor ladder.

Accordingly, analog front circuit 152 may generate the error signal (e.g., error code 154) based on the reference voltage (e.g., Vref 134) and the feedback voltage (e.g., Vfb 144). In some embodiments, analog front circuit 152 may digitize error code 154 for digital controller circuit 156. Thus, error code 154 may be a digital code corresponding to an error signal based on Vref 134 and Vfb 144. Based at least in part on error code 154, digital controller circuit 156 may generate a control signal or a control word (e.g., Ctrl 158) for controlling the state of each power FET in power gate 150, in turn controlling the output voltage from power gate 150. In some embodiments, Ctrl 158 may be used by power gate 150 to change the state of selected FETs from OFF to ON or vice versa. For example, Ctrl 158 may be a control word that includes a plurality of bits. Individual bits of the control word may correspond to individual FETs of the power gate 150, and may have a first value to turn the FET on or a second value to turn the FET off.

In various embodiments, the gain of VCL 132 may be independent of the operating point (e.g., the number of ON FETs in power gate 150 based on Ctrl 158), as the output impedance of the FETs in power gate 150 is usually large. The output impedance of the FETS may be less dependent on the operating point as the FETs may be implemented as current sources controlled by CCL 122. For a change in the operating point, the impedance may be adjusted to give out the same current. As current source typically has large output impedance, the impedance does not vary much with operating point. The plant gain becomes less dependent on the output impedance as the output current from each power FET may be controlled. Further, the plant transfer function may become less dependent on output impedance. In various embodiments, the gain of VCL 132 may include a product of the gain in analog front circuit 152, gain in digital controller circuit 156, and plant gain (e.g., the resistance of power FETs in power gate 150 changes as a function of Ctrl 158). In some embodiments, the gain of VCL 132 may be constant across all controller output codes (e.g., Ctrl 158) so that the bandwidth of power gate 150 may be maximized without additional burden of applying adaptive gain for guaranteeing stability. Accordingly, VCL 132 may observe and regulate the output voltage of power gate 150 for any changes caused by load change of load 160 or other factors.

In various embodiments, apparatus 100 may be implemented differently from the example depicted in FIG. 1. As an example, Ref 140 may be implemented as an integrated sub-circuit of VCC 130. In various embodiments, components depicted in FIG. 1 may have a direct or indirect connection not shown in FIG. 1.

In various embodiments, the two-loop architecture as described herein may reduce the area for a given dropout (e.g., the voltage dropout across the effective resistance of the power FETs in power gate 150) by avoiding duty cycle switching and obviating the need for code roaming or switching logic. In various embodiments, area efficiency may be improved by reducing the overhead associated with duty cycle control of the FETs in power gate 150. The area of FETs may be only dependent on the load current as a transistor channel in power gate 150 may provide continuous current.

Additionally, the two-loop architecture as described herein may make the design of digital controller circuit 156 simpler because the implementation of adaptive gain as a function of controller code is no longer needed as the output impedance of the current source in the plant transfer function is high. Further, this scheme may also simplify the current sense logic for power gate 150 because the total current consumed by load 160 may now be calculated based on a simple multiplication of the constant current per transistor channel with the number of transistors turned on.

Figure 2:
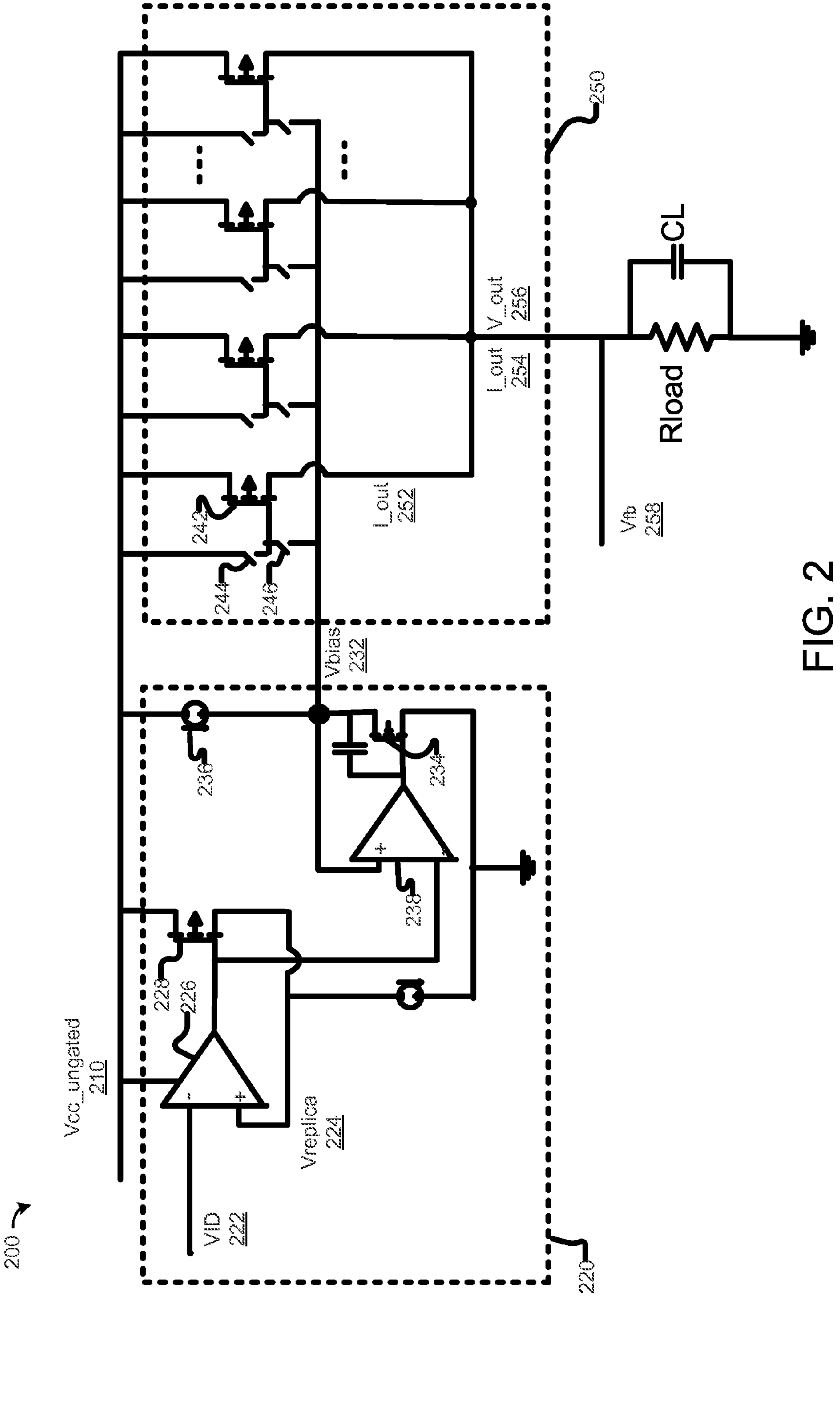
FIG. 2 is a schematic diagram of an example circuit for regulating the current per transistor, incorporating aspects of the present disclosure, in accordance with various embodiments.

FIG. 2 is a schematic diagram of an example circuit 200 for regulating the current per transistor, incorporating aspects of the present disclosure, in accordance with various embodiments. In various embodiments, circuit 200 may include circuit 220, which may be a part of CCC 120 of FIG. 1, and circuit 250, which may be a part of power gate 150 of FIG. 1.

There are many possible circuit implementations of CCC 120 of FIG. 1. In the embodiment shown in FIG. 2, circuit 220 may include a replica circuit, e.g., including transistor 234 and current controller 236 along with amplifier 238. The replica circuit may provide a condition similar to what is provided by the output arm of circuit 250. The replica circuit may be used to regulate individual output current from each transistor in circuit 250. Meanwhile, transistor 228, connected to the output of amplifier 226, may be a replica of a single transistor in circuit 250, e.g. transistor 242.

Circuit 220 may receive VID 222 as a reference and may regulate the output voltage (e.g., Vbias 232) of circuit 220 to a value so as to get the Vreplica 224 to be the same as VID 222, which is also the desired output voltage of circuit 250. Circuit 220 may include amplifier 226, which may be a voltage amplifier or an operational amplifier (op-amp). In this embodiment, amplifier 226 may receive VID 222 and Vreplica 224 at the differential inputs of amplifier 226. Amplifier 226 may also receive Vcc_ungated 210. Circuit 220 may include another amplifier 238, which may be a voltage amplifier or an operational amplifier (op-amp) to receive differential input from the output of amplifier 226 and its buffered output Vbias 232. Current controller 236 may be used for current biasing of the output arm of transistor 234. Amplifier 238 may receive a voltage (e.g., Vbias 232) from the output of amplifier 226 and may function as a buffer for Vbias 232 before Vbias 232 is outputted to circuit 250.

In various embodiments, circuit 220 may output an output voltage (e.g., Vbias 232) to circuit 250 to regulate the output current from respective transistors in circuit 250. The gate voltage for transistor 228 may be buffered with unity gain and available at Vbias 232. Vbias 232 may control the current in the unit transistors (e.g. transistor 242) in circuit 250 in saturation region of operation. In linear region of operation the current may vary with the drain to source voltage.

In this embodiment, Vbias 232 is the gate voltage for transistor 234 in the output arm of replica circuit 220 (i.e. buffered gate voltage for transistor 228) as well as for all the transistors in power gate 250, e.g., transistor 242. On the other hand, the source voltage for all transistors in power gate 250 is Vcc_ungated 210 and for transistor 228. Hence the gate to source voltage is the same for transistor 228 and transistor 242. Further, the drain to source voltage is made the same for transistor 234 and transistor 228 because Vreplica 224 is made the same as V_out 256, both being equal to VID 222. With both gate to source and drain to source voltages being the same, the current in replica output arm connected with transistor 228 which is fixed by current source connected to ground at node Vreplica 224 gets mirrored in output power gate transistors, such as transistor 242. Thus, the output current from respective transistors may be modulated to be constant. In some embodiments, the output current from respective transistors may be modulated based at least in part on a current limit of the respective transistors.

Circuit 250 may include a plurality of transistors including, e.g., transistor 242. In this embodiment, each transistor may be coupled to two switches. As an example, transistor 242 may be coupled to switches 244 and 246. These switches may be controlled by VCC 130 of FIG. 1, e.g., based on Ctrl 158. For instance, either switch 244 or 246 may be closed based on Ctrl 158. When switch 244 is turned ON the gate to source voltage of transistor 242 may reduce to 0, and transistor 242 may be turned OFF. Further, transistor 242 may be turned ON e.g., by charging a gate of transistor 242 to Vbias 232 outputted by circuit 220 by turning ON switch 246.

While being turned ON, the transistor's gate to source and gate to drain capacitors may need to be discharged to the bias voltage (e.g., Vbias 232) in a very short time to have a good settling of Vbias 232 after turning on switch 246. This allows to get current from transistor 242 to be same as current in the transistor 228 in a short duration of a clock period, e.g., of the clock driving the digital controller 156 of FIG. 1. In some embodiments, a fast settling current synchronization amplifier (e.g., amplifier 238), which is also used as buffer for the bias voltage, may be used to achieve this settling. Such amplifier may be designed with a high miller capacitor to provide best transient response when the output voltage (e.g., Vbias 232) goes high due to charge dump on the output when the transistor is turned ON. In this way, the power consumption of the op-amp is reduced as the output stage with miller capacitor acts as a high bandwidth loop. When Vbias 232 goes high, it is coupled to the gate of NMOS transistor 234 through the miller cap, and this helps in getting the vbias 232 down.

In this embodiment, transistor 242 may output a constant current (e.g., I_out 252). This constant current may be decided based on the technology current limit of transistor 242. In one example, a reference current source (e.g., connected at Vreplica 224 to ground) of 120 uA may be used in circuit 220 with 4 power FET legs for the transistor 228. With the negative feedback action, the current per leg may be limited to 30 uA, which becomes the technology specified limit in this case. This current gets mirrored in the unit transistor (e.g., transistor 242) in Circuit 250.

In some embodiments, the number of ON transistors in circuit 250 may be modulated to control the total current from supply to output, which in turn controls the effective resistance of the parallel ON transistors from supply to output. The output voltage Vfb 258 may thus be regulated to be VID 222 by controlling the dropout voltage across the effective resistance of the parallel ON transistors. The dropout voltage is the voltage between supply Vcc_ungated 210 and Vfb 258. In various embodiments, circuit 220 may modulate the effective resistance of the parallel ON transistors as a function of the dropout and keeps the current per transistor constant (e.g., making the transistor a current source).

In various embodiments, as the output current is constant per transistor, the total current outputted from circuit 250 is a simple multiplication of current per transistor channel with the number of transistors turned on, which in turn simplifies the current sense logic for circuit 250.

In various embodiments, the effective resistance of the parallel ON transistors may be controlled in an area and power efficient way. Circuit 220 may modulate the resistance of a single transistor based on the input supply and the programmed output voltage (e.g., based on VID 222). The number of current sources that need to be turned ON may be controlled by VCL 132 of FIG. 1 based on the feedback from the output of circuit 250, e.g., Vfb 258. As the load current increases or decreases, greater or fewer numbers of transistors may be turned ON by VCL 132.

Assuming the output impedance of circuit 250 is much higher than Rload in FIG. 2, the output voltage (e.g., V_out 256) may be written as:

$$V\_out=N*I\_UNIT*R\text{load} \quad \text{(Eq. 1)}$$

Here, N is the number of current sources been turned ON (e.g., based on Ctrl 158 generated from VCL 132). I_UNIT is the current through a single transistor (e.g., transistor 242) (e.g., controlled by circuit 220 or CCC 120 of FIG. 1.). Rload is the effective resistance from the output of circuit 250 to ground.

Figure 3:
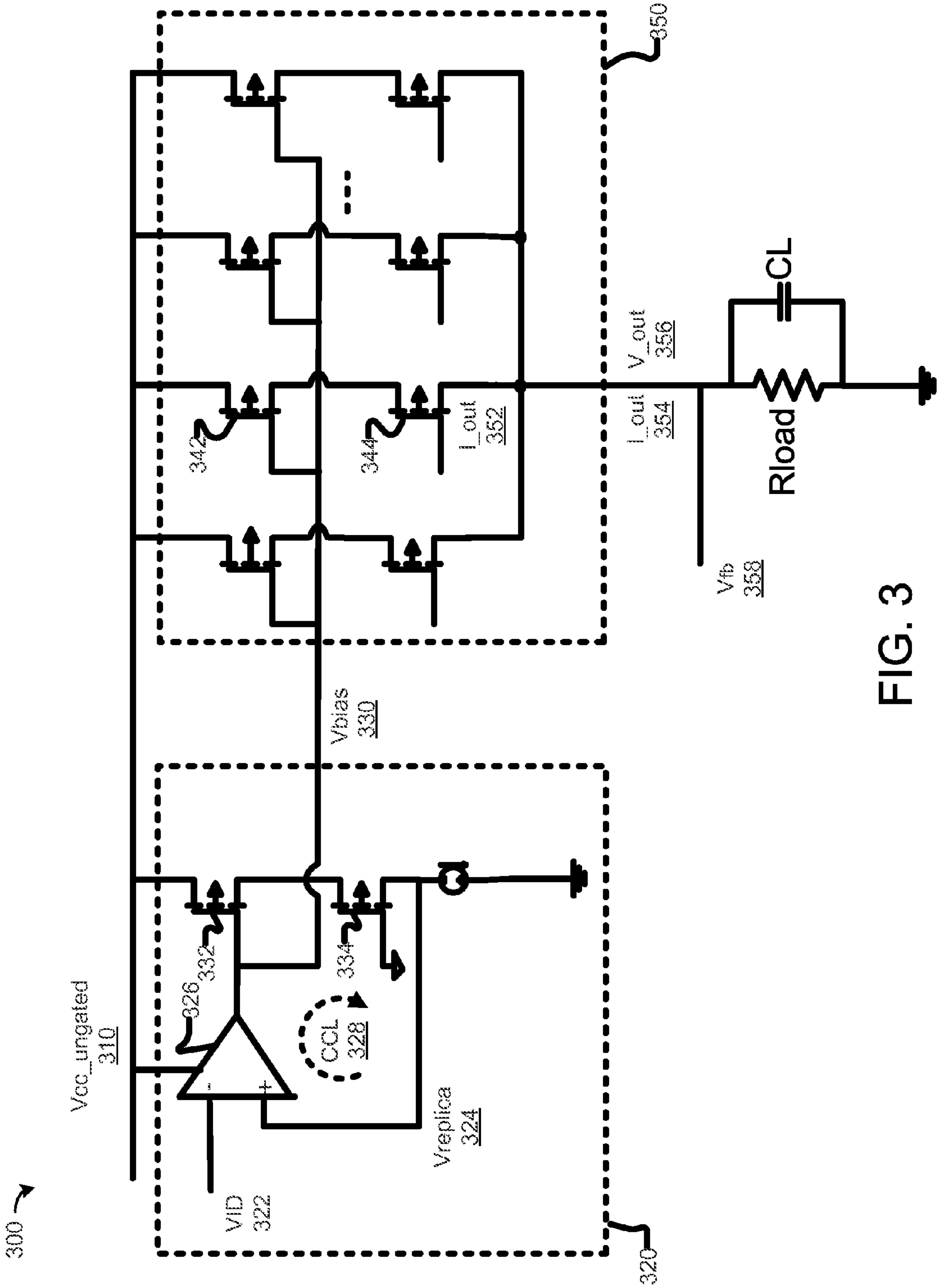
FIG. 3 is a schematic diagram of another example circuit for regulating the current per transistor, incorporating aspects of the present disclosure, in accordance with various embodiments.

FIG. 3 is a schematic diagram of another example circuit 300 for regulating the current per transistor, incorporating aspects of the present disclosure, in accordance with various embodiments. Circuit 300 and previous illustrated circuit 200 show two schemes to limit the current per transistor. Other similar schemes to make the power FET a current source may also be implemented.

In this embodiment, circuit 300 may include a replica circuit 320, e.g., including amplifier 326, transistor 332, and transistor 334. Replica circuit 320 may regulate individual output current from each transistor in circuit 350. As an example, replica circuit 320 may enable terminal voltages across unit transistor in circuit 350 to be equal to the terminal voltage across transistor 332.

Circuit 320 may receive VID 322 as a reference and may regulate the output voltage (e.g., Vbias 330) of circuit 320 to a value so as to keep Vreplica 324 to be equal to the desired output voltage of circuit 350, both being equal to VID 322.

Circuit 320 may include amplifier 326, which may be a voltage amplifier or an operational amplifier (op-amp). In this embodiment, amplifier 326 may receive VID 322 and Vreplica 324 at differential inputs of the amplifier 326, and may further receive Vcc_ungated 310. In various embodiments, circuit 320 may output an output voltage (e.g., Vbias 332) to circuit 350 to regulate the output current from respective transistors in circuit 350. In some embodiments, the output current from respective transistors in circuit 350 may be modulated to be constant. In some embodiments, the output current from respective transistors in circuit 350 may be modulated based at least in part on a current limit of the respective transistors.

Circuit 350 may include a plurality of current-source transistors including, e.g., transistor 342. In this embodiment, each current-source transistor may be coupled to another transistor that functions as a switch. As an example, transistor 342 may be coupled to switch transistor 344 in serial. Transistor 344 may be controlled by VCC 130 of FIG. 1, e.g., based on Ctrl 158. For instance, transistor 344 may be turned on based on Ctrl 158. In turn, the current from transistor 342 may flow through the turned ON transistor 344 to the output V_out 356

In this embodiment, transistor 342 may output a constant current (e.g., I_out 352). In various embodiments, as the output current is constant per transistor, the total current (e.g., I_out 354) outputted from circuit 350 is a simple multiplication of current per transistor channel with the number of transistor channels turned on, which in turn simplifies the current sense logic for circuit 350. The output voltage of circuit 350, i.e., V_out 356 may be regulated by VCC 130 of FIG. 1. e.g., based at least in part on the feedback voltage (e.g., Vfb 358) to VCL 132.

By using a current control loop (e.g., CCL 328) to limit the current per transistor channel in circuit 350, the gate bias voltage of the transistor may be varied as a function of the input supply voltage and the output voltage from circuit 350 for a given process and temperature. For a transistor (e.g. transistor 342) acting as the current source, typically, the output impedance is high compared to the load impedances at the output V_out 356. VCL 132 of FIG. 1 may be used to control the number of current sources to be turned ON to maintain the output voltage (e.g., V_out 356). The loop gain of VCL 132 may become independent of the output impedance of circuit 350 across various operating points. In this case, the digital control loop (e.g., VCL 132 of FIG. 1) may become stable for all operating conditions with maximum possible bandwidth, without using any adaptive gain.

In various embodiments, the signal controller gain (SCG) for VCL 132 of FIG. 1 may be expressed as a function of current in unit current source.

$$SCG=\text{Delta }V\text{out/Delta Controller\_output}=I\_UNIT*R\text{load} \quad \text{(Eq. 2)}$$

Here Delta Vout is change in the V_out 356. and Delta Controller_output is the change of the controller code (e.g., Ctrl 125 of FIG. 1).

This equation is obtained by differentiation of equation 1. Here, Delta controller output=N+1−N=1. Thus, the gain is independent of controller code (e.g., Ctrl 158) and hence simplifies the design of VCC 130 of FIG. 1.

Figure 4:
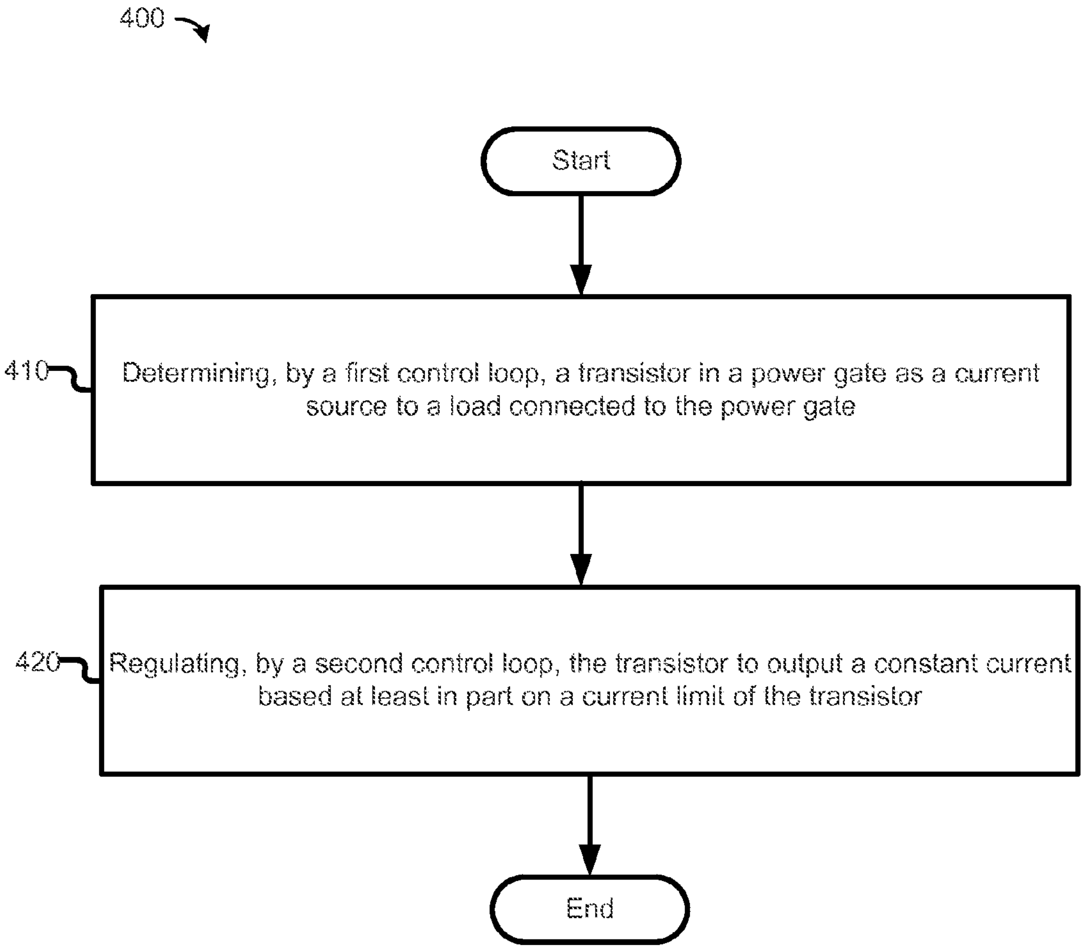
FIG. 4 is a flow diagram of an example process executable by an example apparatus for power management, in accordance with various embodiments.

FIG. 4 is a flow diagram of an example process 400 executable by an example apparatus for power management, in accordance with various embodiments. As shown, process 400 may be performed by a circuit (e.g., circuit 100 of FIG. 1) utilizing the design principals as disclosed herein to implement one or more embodiments of the present disclosure.

In some embodiments, at 410, the process 400 may include determining, by a first control loop, e.g., VCL 132 of FIG. 1, whether a transistor in a power gate is to be activated as a current source to a load connected to the power gate. In some embodiments, the first control loop may output a control signal or control word (e.g., Ctrl 158) to control the state of each current source in the power gate, in turn controlling the output voltage from the power gate.

In some embodiments, the first control loop may include an analog front circuit to receive and compare a reference voltage to a feedback voltage outputted from the power gate. Further, the analog front circuit may produce an error code based on the comparison. A digital controller circuit of the first control loop then may generate the control signal or control word (e.g., Ctrl 158) to enable the power gate to select one or more current sources (e.g., power FETs) to supply to the load coupled to the power gate.

In various embodiments, the first control loop may produce a gain which is first order independent of the controller code (e.g., assuming the output impedance of the current source is very large) that it generated for the power gate to select the number of current sources (e.g., the number of power FETs) that are activated. In various embodiments, the first control loop may produce a gain independent of an output impedance of the power gate to first order under the assumption of load impedance being much smaller than output impedance of power gate, which is implemented as current source.

In some embodiments, at 420, the process 400 may include regulating, by a second control loop (e.g., CCL 122 of FIG. 1), the transistor to output a constant current based at least in part on a current limit of the transistor. As an example, CCL 328 of FIG. 3 may regulate transistor 342 to output a constant current I_out 352 based at least in part on the current limit of transistor 342 and determined by the current source connected at Vreplica 324 to ground.

In some embodiments, the second control loop may modulate a bias voltage (e.g., Vbias 330) to the power gate based at least in part on a voltage identity (e.g., VID 322) received by the second control loop. The second control loop may regulate the transistor to output a constant current by charging a gate of the transistor to the bias voltage supplied by the second control loop. The second control loop may regulate the transistor to output a constant current by discharging a gate to source capacitor and a gate to drain capacitor of the transistor based on the bias voltage. In various embodiments, The second control loop may modulate a resistance of the power gate as a function of a dropout between a supply voltage and an output voltage of the power gate.

Figure 5:
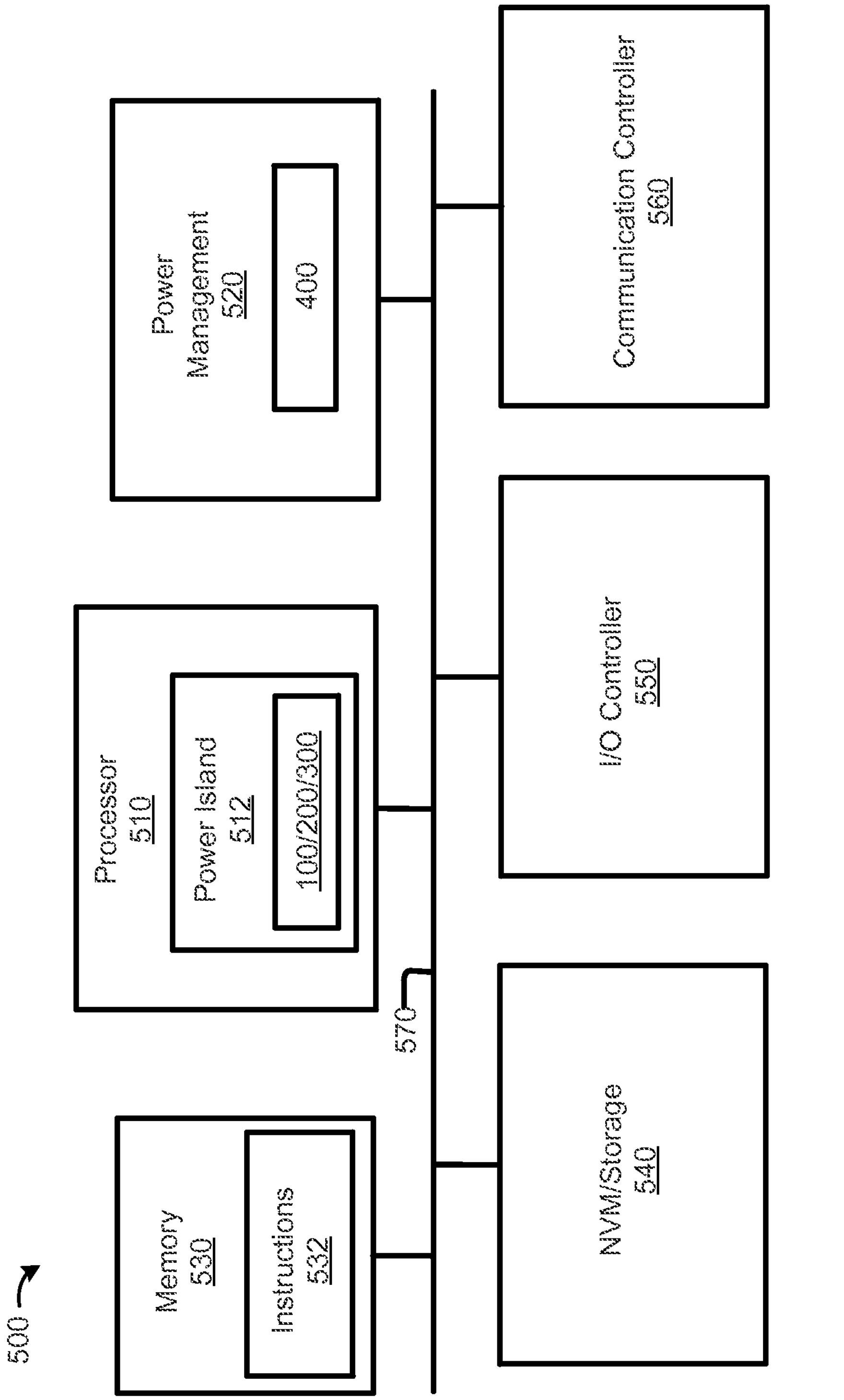
FIG. 5 is a block diagram that illustrates an example computer device suitable for practicing the disclosed embodiments, in accordance with various embodiments.

FIG. 5 is a block diagram that illustrates an example computer system 500 suitable for practicing the disclosed embodiments with any of the design principles described with reference to FIGS. 1-4, in accordance with various embodiments. In some embodiment, computer system 500 represents a system on chip (SoC), which may be used in embedded systems or mobile electronics. In one embodiment, computer system 500 represents a mobile computing device, such as a computing tablet, a mobile phone or smartphone, a wireless-enabled e-reader, or another wireless mobile device. In other embodiments, computer system 500 may be a laptop computer, a desktop computer, or a server. It will be understood that certain components are shown generally, and not all components of such a device are shown in computing system 500.

As shown, computer system 500 may include power management circuitry 520; a number of processors or processor cores 510, a system memory 530 having processor-readable, a non-volatile memory (NVM)/storage 540, an L/O controller 550, and a communication controller 560. For the purpose of this application, including the claims, the terms "processor" and "processor cores" may be considered synonymous, unless the context clearly requires otherwise. Those elements of FIG. 5 having the same reference numbers (or names) as the elements of any other figure can operate or function in any manner similar to that described, but are not limited to such.

In one embodiment, processors 510 may include one or more physical devices, such as microprocessors, application processors, microcontrollers, programmable logic devices, or other processing means. The processing operations performed by processors 510 may include the execution of an operating platform or operating system on which applications and/or device functions are executed. The processing operations may include operations related to input/output (I/O) with a human user or with other devices, operations related to power management, and/or operations related to connecting the computing system 500 to another device. The processing operations may also include operations related to audio I/O and/or display I/O.

In some embodiments, power management circuitry 520 may include logic to implement the process 400 of FIG. 4 for power management, e.g., in a SoC. In various embodiments, processors 510 may include apparatus 100 of FIG. 1, circuit 200 of FIG. 2, and/or circuit 300 of FIG. 3 described in this disclosure, which may be used to regulate respective current sources in power island 512 to output a constant current with a two-loop architecture. In some other embodiments, the current sources and switches may be put as part of power management 520 itself.

In various embodiments, power island 512 may be supplied with the minimal amount of power and frequency to meet its performance and real-time response needs. Thus, power management circuitry 520 may enable system 500 to reduce power consumption with the combination of varying voltage and operating frequency for a power island. In other embodiments, similar power islands may be designed into system memory 530, NVM/storage 540, I/O controller 550, or communication controller 560 for power management. Power management circuitry 520 may make dynamic changes to the voltages and frequencies being applied to respective power islands, thus to achieve better low-power operation of mobile electronics.

The one or more NVM/storage 540 and/or the system memory 530 may comprise a tangible, non-transitory computer-readable storage device (such as a diskette, hard drive, compact disc read only memory (CD-ROM), hardware storage unit, flash memory, phase change memory (PCM), solid-state drive (SSD) memory, and so forth).

Computer system 500 may also include input/output devices (not shown) coupled to computer system 500 via I/O controller 550. I/O controller 550 illustrates a connection point for additional devices that connect to computing system 500 through which a user might interact with the system. For example, various devices that may be coupled to the computer system 500 via I/O controller 550 may include microphone devices, speaker or stereo systems, video systems or other display devices, keyboard or keypad devices, or other I/O devices for use with specific applications such as card readers or other devices.

In embodiments, communication controller 560 may provide an interface for computing system 500 to communicate over one or more network(s) and/or with any other suitable device. Communication controller 560 may include any suitable hardware and/or firmware, such as a network adapter, one or more antennas, wireless interface(s), and so forth. In various embodiments, communication controller 560 may include an interface for computing system 500 to use near field communication (NFC), optical communications, or other similar technologies to communicate directly (e.g., without an intermediary) with another device. In various embodiments, communication controller 560 may interoperate with radio communications technologies such as, for example, Wideband Code Division Multiple Access (WCDMA), Global System for Mobile Communications (GSM), Long Term Evolution (LTE), WiFi, Bluetooth®, Zigbee, and the like.

The various elements of FIG. 5 may be coupled to each other via a system bus 570, which represents one or more buses. In the case of multiple buses, they may be bridged by one or more bus bridges (not shown). Data may pass through the system bus 570 through the I/O controller 550, for example, between an output terminal and the processors 510.

System memory 530 and NVM/storage 540 may be employed to store a working copy and a permanent copy of the programming instructions implementing one or more operating systems, firmware modules or drivers, applications, and so forth, herein collectively denoted as instructions 532. In various embodiments, instructions 532 may include instructions for executing process 400 of FIG. 4 described in this disclosure for power management. The permanent copy of the programming instructions may be placed into permanent storage in the factory, or in the field, via, for example, a distribution medium (not shown), such as a compact disc (CD), or through the communication controller 560 (from a distribution server (not shown)).

In some embodiments, at least one of the processor(s) 510 may be packaged together with I/O controller 550 to form a System in Package (SiP). In some embodiments, at least one of the processor(s) 510 may be integrated on the same die with I/O controller 550. In some embodiments, at least one of the processor(s) 510 may be integrated on the same die with I/O controller 550 to form a System on Chip (SoC).

According to various embodiments, one or more of the depicted components of the system 500 and/or other element(s) may include a keyboard, LCD screen, non-volatile memory, multiple antennas, graphics processor, application processor, speakers, or other associated mobile device elements, including a camera. The remaining constitution of the various elements of the computer system 500 is known, and accordingly will not be further described in detail.

The above description of illustrated embodiments, including what is described in the Abstract, is not intended to be exhaustive or to be limited to the precise forms disclosed. While specific embodiments and examples are described herein for illustrative purposes, various modifications are possible. For example, the configuration and connection of certain elements in various embodiments that have been described above may be modified without departing from the teachings in connection with FIGS. 1-5. These and other modifications can be made in light of the above detailed description. The terms used in the following claims should not be construed to be limited to the specific embodiments disclosed in the specification.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is always only one of the elements. If the specification or claims refer to "an additional" element, that does not preclude there being more than one of the additional element.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications, and variations of such embodiments will be apparent to those of ordinary skill in the art in light of the foregoing description. The embodiments of the disclosure are intended to embrace all such alternatives, modifications, and variations as to fall within the broad scope of the appended claims.

In addition, well-known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to the implementation of such block diagram arrangements are highly dependent upon the platform within which the present disclosure is to be implemented (i.e., such specifics should be well within the purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

The following examples pertain to further embodiments. Specifics in the examples may be used anywhere in one or more embodiments. All optional features of the apparatus described herein may also be implemented with respect to a method or process.

Example 1 is an apparatus, which may include a power gate, coupled to a load, including a plurality of current sources. The apparatus may further include a voltage control circuit, coupled to the power gate, to determine and select one or more current sources of the plurality of current sources to supply to the load. The apparatus may further include a current control circuit, coupled to the voltage control circuit, to control individual current sources of the one or more current sources to output a constant current.

Example 2 may include the subject matter of Example 1, and may further specify that the plurality of current sources are coupled to a power source, and wherein the current control circuit includes a replica circuit to output an output voltage to the power gate to regulate the constant current based at least in part on a current limit of the one or more current sources.

Example 3 may include the subject matter of Example 1 or 2, and may further specify that the current control circuit includes a replica circuit to output a bias voltage to the power gate and to regulate the bias voltage to a desired value of an output voltage of the power gate based at least in part on a voltage identity received by the current control loop.

Example 4 may include the subject matter of Example 3, and may further specify that the replica circuit includes an amplifier to receive the voltage identity and a power supply, and to output the bias voltage.

Example 5 may include the subject matter of Example 4, and may further specify that the plurality of current sources include a plurality of transistors, wherein a first transistor of the plurality of transistors is to charge a gate of the first transistor to the bias voltage generated by the current control circuit.

Example 6 may include the subject matter of Example 4 or 5, and may further specify that the amplifier is a first amplifier, and wherein the replica circuit further includes a second amplifier coupled to the first amplifier to receive the bias voltage and to buffer the bias voltage.

Example 7 may include any subject matter of Examples 1-6, and may further specify that the voltage control circuit include an analog module to generate a digital code corresponding to an error signal based on a reference voltage received from a reference voltage source and a feedback voltage received from the power gate.

Example 8 may include the subject matter of Example 7, and may further specify that the voltage control circuit further comprises a digital controller, coupled to the analog module, to determine and select the one or more current sources based at least in part on the digital code corresponding to the error signal.

Example 9 may include any subject matter of Examples 1-8, and may further specify that the voltage control circuit includes a control loop with a gain that is independent of an output impedance of the power gate.

Example 10 may include any subject matter of Examples 1-9, and may further specify that the current control circuit includes a control loop with a gain that is independent of a number of the one or more current sources selected by the voltage control circuit.

Example 11 may include the subject matter of Example 10, and may further specify that the current control circuit includes a control loop with a first speed, wherein the voltage control circuit includes a control loop with a second speed, wherein the second speed is faster than the first speed.

Example 12 may include any subject matter of Examples 1-11, and may further specify that the current control circuit is to modulate a resistance of the power gate as a function of a dropout between a supply voltage and an output voltage of the power gate.

Example 13 is a method for power management, which may include determining, by a first control loop, a transistor in a power gate as an active current source to a load connected to the power gate; and regulating, by a second control loop, the transistor to output a constant current based at least in part on a current limit of the transistor.

Example 14 may include the subject matter of Example 13, and may further include modulating, by the second control loop, a bias voltage to a desired output voltage of the power gate based at least in part on a voltage identity received by the second control loop; and supplying, by the second control loop, the bias voltage to the transistor in the power gate.

Example 15 may include the subject matter of Example 14, and may further specify that regulating further includes charging a gate of the transistor to the bias voltage supplied by the second control loop.

Example 16 may include any subject matter of Examples 14-15, and may further specify that regulating further includes discharging a gate to source capacitor and a gate to drain capacitor of the transistor based on the bias voltage.

Example 17 may include any subject matter of Examples 13-16, and may further include comparing, by a first control loop, a reference voltage to a feedback voltage outputted from the power gate; and selecting, by a first control loop, one or more transistors of the power gate to be current sources to the load.

Example 18 may include any subject matter of Examples 13-17, and may further include producing a gain of the first control loop independent of a number of the one or more transistors selected.

Example 19 may include any subject matter of Examples 13-18, and may further include producing a gain of the first control loop independent of an output impedance of the power gate.

Example 20 may include any subject matter of Examples 13-19, and may further include modulating, by a second control loop, a resistance of the power gate as a function of a dropout between a supply voltage and an output voltage of the power gate.

Example 21 is at least one non-transient storage medium, which may include a plurality of instructions configured to cause an apparatus, in response to execution of the instructions by the apparatus, to practice any subject matter of Examples 13-20.

Example 22 is an apparatus, which may include means to practice any subject matter of Examples 13-20.

Example 23 is a system on chip (SoC) for computing, which may include an integrated circuit (IC) die including a power island with a power gate coupled to a load, the power gate including a plurality of current sources. The IC die may include a voltage control circuit, coupled to the power gate, to determine one or more current sources of the plurality of current sources to supply current to the load; and the IC die including a current control circuit, coupled to the voltage control circuit, to control individual current sources of the one or more current sources to output a constant current.

Example 24 may include the subject matter of Example 23, and may further specify that the voltage control circuit includes a control loop with a gain that is independent of a number of the one or more current sources selected by the voltage control circuit.

Example 25 may include the subject matter of Example 23 or 24, and may further specify that the current control circuit is to modulate a resistance of the power gate as a function of a dropout between a supply voltage and an output voltage of the power gate.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

We claim:

1. An apparatus, comprising:

a power gate, coupled to a load, including a plurality of current sources;

a voltage control circuit, coupled to the power gate, to determine and select one or more current sources of the plurality of current sources to supply to the load; and a current control circuit, coupled to the voltage control circuit, to control individual current sources of the one or more current sources to output a constant current.

2. The apparatus of claim 1, wherein the plurality of current sources are coupled to a power source, and wherein the current control circuit includes a replica circuit to output an output voltage to the power gate to regulate the constant current based at least in part on a current limit of the one or more current sources.

3. The apparatus of claim 1, wherein the current control circuit comprises a replica circuit to output a bias voltage to the power gate and to regulate the bias voltage to a desired value of an output voltage of the power gate based at least in part on a voltage identity received by the current control circuit.

4. The apparatus of claim 3, wherein the replica circuit comprises an amplifier to receive the voltage identity and a power supply, and to output the bias voltage.

5. The apparatus of claim 4, wherein the plurality of current sources comprise a plurality of transistors, wherein a first transistor of the plurality of transistors is to charge a gate of the first transistor to the bias voltage generated by the current control circuit.

6. The apparatus of claim 4, wherein the amplifier is a first amplifier, and wherein the replica circuit further comprises a second amplifier coupled to the first amplifier to receive the bias voltage and to buffer the bias voltage.

7. The apparatus of claim 1, wherein the voltage control circuit comprises an analog module to generate a digital code corresponding to an error signal based on a reference voltage received from a reference voltage source and a feedback voltage received from the power gate.

8. The apparatus of claim 7, wherein the voltage control circuit further comprises a digital controller, coupled to the analog module, to determine and select the one or more current sources based at least in part on the digital code corresponding to the error signal.

9. The apparatus of claim 1, wherein the voltage control circuit comprises a control loop with a gain that is independent of an output impedance of the power gate.

10. The apparatus of claim 1, wherein the current control circuit comprises a control loop with a gain that is independent of a number of the one or more current sources selected by the voltage control circuit.

11. The apparatus of claim 1, wherein the current control circuit comprises a control loop with a first speed, wherein the voltage control circuit includes a control loop with a second speed, wherein the second speed is faster than the first speed.

12. The apparatus of claim 1, wherein the current control circuit is to modulate a resistance of the power gate as a function of a dropout between a supply voltage and an output voltage of the power gate.

13. A method, comprising:

determining, by a first control loop, a transistor in a power gate as an active current source to a load connected to the power gate; and regulating, by a second control loop, the transistor to output a constant current based at least in part on a current limit of the transistor.

14. The method of claim 13, further comprising:

modulating, by the second control loop, a bias voltage to a desired output voltage of the power gate based at least in part on a voltage identity received by the second control loop; and supplying, by the second control loop, the bias voltage to the transistor in the power gate.

15. The method of claim 14, wherein regulating further comprises charging a gate of the transistor to the bias voltage supplied by the second control loop.

16. The method of claim 14, wherein regulating further comprises discharging a gate to source capacitor and a gate to drain capacitor of the transistor based on the bias voltage.

17. The method of claim 13, further comprising:

comparing, by the first control loop, a reference voltage to a feedback voltage outputted from the power gate; and selecting, by the first control loop, one or more transistors of the power gate to be current sources to the load.

18. The method of claim 17, further comprising:

producing a gain of the first control loop independent of a number of the one or more transistors selected.

19. The method of claim 13, further comprising:

producing a gain of the first control loop independent of an output impedance of the power gate.

20. The method of claim 13, further comprising:

modulating, by the second control loop, a resistance of the power gate as a function of a dropout between a supply voltage and an output voltage of the power gate.

21. A system on chip (SoC), comprising:

an integrated circuit (IC) die including a power island with a power gate coupled to a load, the power gate including a plurality of current sources;

the IC die including a voltage control circuit, coupled to the power gate, to determine one or more current sources of the plurality of current sources to supply current to the load; and the IC die including a current control circuit, coupled to the voltage control circuit, to control individual current sources of the one or more current sources to output a constant current.

22. The SoC of claim 21, wherein the voltage control circuit includes a control loop with a gain that is independent of a number of the one or more current sources selected by the voltage control circuit.

23. The SoC of claim 21, wherein the current control circuit is to modulate a resistance of the power gate as a function of a dropout between a supply voltage and an output voltage of the power gate.

* * * * *